United States Patent [19]

Martigny et al.

[11] Patent Number: 5,221,559
[45] Date of Patent: Jun. 22, 1993

[54] METHOD OF TREATING A METALLIC REINFORCEMENT SO AS TO FAVOR ITS ADHERENCE TO A RUBBER BASE COMPOSITION AND OF PRODUCING AN ARTICLE WITH SAID REINFORCEMENTS; REINFORCEMENTS AND ARTICLES OBTAINED BY THESE

[75] Inventors: Patrick Martigny; Didier Vasseur, both of Clermont-Ferrand, France

[73] Assignee: Compagnie Generale des Etablissements Michelin-Michelin & Cie, Clermont-Ferrand Cedex, France

[21] Appl. No.: 808,052

[22] Filed: Dec. 12, 1991

Related U.S. Application Data

[63] Continuation of Ser. No. 475,710, Feb. 6, 1990, abandoned.

[30] Foreign Application Priority Data

Feb. 17, 1989 [FR] France .................................. 89 02214

[51] Int. Cl.⁵ ............................................. C23C 26/00
[52] U.S. Cl. .................................. 427/419.5; 427/327; 427/434.6
[58] Field of Search .................. 427/434.6, 327, 207.1, 427/419.5

[56] References Cited

U.S. PATENT DOCUMENTS

| | | | |
|---|---|---|---|
| 2,912,355 | 11/1959 | Formanek | 156/307.5 |
| 2,917,422 | 12/1959 | Waller | 427/434.6 |
| 3,628,992 | 12/1971 | McKillip | 427/207.1 |
| 3,905,947 | 9/1975 | Cowell | 156/910 |
| 4,057,529 | 11/1977 | Leo | 156/910 |
| 4,158,378 | 6/1979 | Pearson | 427/421 |
| 4,170,673 | 10/1979 | Conti | 427/434.6 |
| 4,182,639 | 1/1980 | Pignocco et al. | 148/6.17 |
| 4,192,694 | 3/1980 | Rye | 148/6.11 |
| 4,214,058 | 7/1980 | Imamura | 427/388.2 |
| 4,218,517 | 8/1980 | Van Ooij | 152/451 |
| 4,255,496 | 3/1981 | Haemers | 152/565 |
| 4,333,785 | 6/1982 | Erickson | 427/309 |
| 4,347,290 | 8/1982 | Haemers | 152/451 |
| 4,409,055 | 10/1983 | Elmer | 427/434.6 |
| 4,704,337 | 11/1987 | Coppens | 152/565 |

FOREIGN PATENT DOCUMENTS

| | | |
|---|---|---|
| 747329 | 11/1966 | Canada .................. 427/207.1 |
| 9846 | 4/1980 | European Pat. Off. . |
| 0061986 | 6/1982 | European Pat. Off. . |
| 0137986 | 4/1985 | European Pat. Off. . |
| 159600 | 10/1985 | European Pat. Off. . |
| 498256 | 1/1939 | United Kingdom ............. 427/309 |
| 539585 | 9/1941 | United Kingdom ............. 427/327 |
| 1389800 | 4/1975 | United Kingdom . |
| 2039580 | 8/1980 | United Kingdom . |

OTHER PUBLICATIONS

International Polymer Science and Technology, vol. 11, No. 12, 1984, pp. 83-90, Shawbury, Shrewsbury, GB; M. Ashida: "Adhesion of Rubber To Metal".

*Primary Examiner*—Shrive Beck
*Assistant Examiner*—Vi Duong Dang
*Attorney, Agent, or Firm*—Brumbaugh, Graves, Donohue & Raymond

[57] ABSTRACT

A method of treating a reinforcement at least the surface of which is metallic in such a manner as to favor its adherence to a rubber-base composition, characterized by the fact that the surface of this reinforcement is placed in contact with a solution of at least one cobalt and/or nickel compound in at least one organic compound containing one or more hydroxyl groups at a temperature of more than 100° C. before placing the reinforcement in contact with the composition.

11 Claims, 1 Drawing Sheet

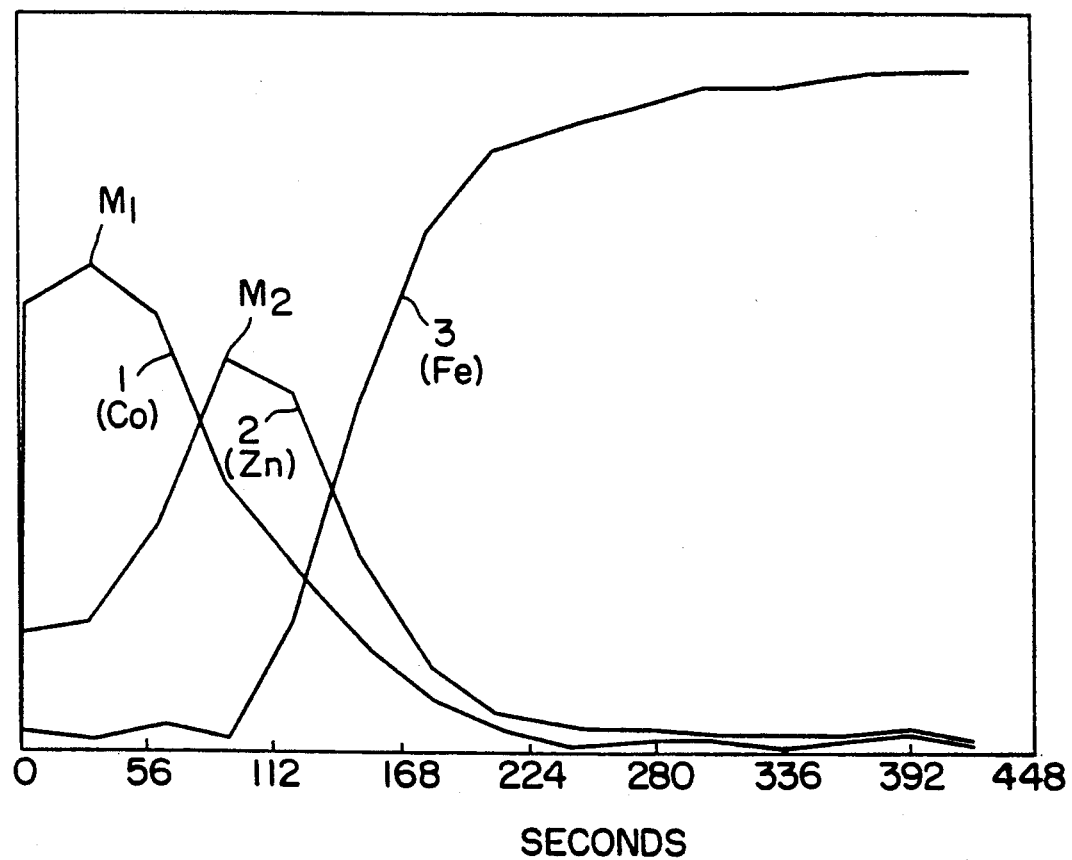

METHOD OF TREATING A METALLIC REINFORCEMENT SO AS TO FAVOR ITS ADHERENCE TO A RUBBER BASE COMPOSITION AND OF PRODUCING AN ARTICLE WITH SAID REINFORCEMENTS; REINFORCEMENTS AND ARTICLES OBTAINED BY THESE

This application is a continuation of application Ser. No. 07/475,710 filed on Feb. 6, 1990, now abandoned.

The present invention relates to methods which make it possible to cause reinforcements at least the surface of which is metallic to adhere to rubber-base compositions. These methods are used, for instance, to produce articles such as belts, hoses and tires. The articles are reinforced with metal reinforcements which consist, for instance, of wires, cables or bead rings.

BACKGROUND OF THE INVENTION

It is known to incorporate metal compounds, in particular compounds of cobalt, into these rubber-base compositions in order to promote the adherence of the metal reinforcements to rubber. Such compounds are described, for example, in the following patents or patent applications: FR 2 198 830, FR 2 311 797, FR 2 368 515, GB 1 122 528, U.S. Pat. Nos. 2,912,355, 3,905,947, 4,057,529, 4,203,874, Ep 3820, EP 9000, DD 122 255, and JP Application 45-114693 published under No. 49-20072.

This technique has the following drawbacks:

(a) the metal compounds extensively modify the working properties and the performance of vulcanized rubber-base compositions, in particular their resistance to thermal aging is substantially altered; and (b) the adhesion performance of the articles obtained is at times insufficient and one can observe poor performance of the adhesion at high temperatures and/or with respect to corrosion, in particular corrosion due to salt water.

It has also been proposed to deposit a layer of a metal or metal alloy on the surface of the reinforcements so as to improve their adherence to the rubber-base compositions, this deposit being produced electrolytically or chemically, as described for example in FR 2 387 273, FR 2 426 562, FR 2 445 764, EP 9846, EP 188 036, and EP 159 600. This technique has the drawback of making the drawing of wire reinforcements very difficult.

Moreover, such a deposit is very difficult to produce on thin wires.

It has also been proposed to coat the surfaces of the reinforcements or the rubber-base compositions with an organometallic compound capable of favoring the rubber-metal adherence and of then effecting the vulcanization of the assembly consisting of the reinforcements, the organometallic compound and the compositions, as described for instance in the following documents: EP 137 986, and JP 54-146880 (Kokai). The articles thus produced are characterized by great fragility.

The object of the present invention is to overcome these drawbacks.

SUMMARY OF THE INVENTION

Therefore, the method of the invention for treating a reinforcement, at least the surface of which is metallic, in order to promote its adherence to a rubber-base composition is characterized by the fact that the surface of this reinforcement is placed in contact with a solution of at least one member of the group consisting of cobalt compounds, nickel compounds and compounds of both cobalt and nickel in at least one organic compound containing one or more hydroxyl groups at a temperature above 100° C., before placing the reinforcement in contact with the rubber-base composition.

The invention also relates to the reinforcements obtained by the method according to the above definition.

The invention also concerns a method of producing a rubber article characterized by vulcanizing a rubber-base composition in contact with a reinforcement that has been treated in accordance with the method described above, the rubber base composition being preferably without cobalt and/or nickel compound capable of favoring adherence of the reinforcement to the composition.

The invention also concerns vulcanized or unvulcanized rubber articles containing reinforcements that have been treated in accordance with the invention.

The cobalt and/or nickel compounds which can be used in the invention may or may not contain sulfur.

The sulfur-containing compounds of the group consisting of cobalt compounds, nickel compounds and compounds of both cobalt and nickel which can be used are, for instance, thiophene carboxylates of Formula (1):

$$\left[ \underset{S}{\boxed{\phantom{xx}}} -COO^- \right]_2 M^{2+}$$

or compounds of Formula (2):

$$[COO^- -(CH_2)_m - S_n - (CH_2)_p - COO^-] \, M^{2+}$$

in which m, n and p, which may be either identical or different, have values which may vary preferably from 1 to 5; or compounds of Formula (3):

$$[S^- -(CH_2)_q - S^-] \, M^{2+}$$

in which q is preferably equal to 6.

In all these formulas, M represents cobalt and/or nickel. These sulfur compounds may or may not be hydrated.

By way of example, such compounds are, for instance, thiodipropionates of the formula:

$$[COO^- -(CH_2)_2 - S - (CH_2)_2 - COO^-]M^{2+},$$

dithiodipropionates of the formula:

$$[COO^- -(CH_2)_2 - S - S - (CH_2)_2 - COO^-]M^{2+},$$

the thiodiacetates of the formula: $[COO^- -CH_2 - S - CH_2 - COO^-]M^{2+}$, and the hexane dithiolates of the formula: $[S^- -(CH_2)_6 - S^-]M^{2+}$.

The thiodipropionate of cobalt or nickel, corresponding to Formula (2) in which m and p are equal to 2 and n is equal to 1, are preferably employed as sulfur-containing product.

The non-sulfur-containing cobalt and/or nickel compounds which can be used in the invention may be organic salts, for instance acetates, propionates, benzoates, naphthenates, hydroxides or organic complexes, for example acetylacetonates. These non-sulfur-containing compounds may or may not be hydrated.

Several of the sulfur-containing and/or non-sulfur-containing products can be used in admixture.

Cobalt compounds are preferably employed, the most advantageous compound being cobalt thiodipropionate.

The organic compounds having hydroxyl groups can, for instance, be ethylene glycol, diethylene glycol, the polyethyleneglycols and 1,3-butanediol, several of which compounds may be used in admixture.

The rubbers which can be used in the invention are preferably sulfur-vulcanizable rubbers such as, for instance, natural rubber, polybutadiene, styrene-butadiene copolymers, polyisoprene or mixtures of these rubbers. The compositions having a base of such rubbers may contain, in known manner, various adjuvants, for instance vulcanization accelerators, antioxidants and fillers.

The reinforcements may be formed entirely of metals or contain non-metallic materials. For example, plastic materials covered with one or more metals or alloys may be employed. The metal surface of the reinforcement intended to come into contact with the solution is preferably made, in whole or in part, with at least one metal the electronegativity potential of which is less than that of the metal or those of the metals (cobalt and/or nickel) of the compound(s) contained in the solution. For instance the metal surface of the reinforcement may be zinc, iron, chromium, manganese, magnesium, aluminum or tin, or may be steel or brass. The electronegativity potential is determined according to the scale of Pauling's method.

The invention will be better understood with the aid of the following examples and the sole FIG. 1 of the drawing, which shows diagrammatically the Auger profile of a reinforcement treated in accordance with the invention.

A basic formulation is produced, the composition of which is as follows:

| | |
|---|---|
| natural rubber | 100 |
| carbon black | 60 |
| zinc oxide (ZnO) | 8 |
| stearic acid | 0.7 |
| Santoflex 13 antioxidant | 2 |
| sulfur | 5 |
| DCBS | 1 |

All of these figures correspond to parts by weight; the same is true of all the rubber-base compositions described in the present application.

Santoflex 13 is a product manufactured by Monsanto, the nomenclature of which is:

N-(1,3-dimethylbutyl)-N'-phenylparaphenylenediamine.

DCBS is dicyclohexyl-benzothiazol-sulfenamide, this product serving as vulcanization accelerator.

In all of the examples which follow, two rubber-base compositions are used:

either the basic formulation given above as such, this composition being indicated as "A"; or the basic formulation given above, with the incorporation therein of 3 parts by weight of cobalt naphthenate, this composition being indicated as B, the cobalt naphthenate favoring the adherence of the metallic reinforcements to this composition.

The following metallic reinforcements are used:

a cable of formula 6×23 formed of 6 brass-plated steel wires twisted together, these wires having a diameter of 0.23 mm. This reinforcement is referred to as "a"; the brass consists of 68% copper and 32% zinc (% by weight);

a cable of formula 6×23 formed of 6 unbrassed steel wires. The wires, which have a diameter of 0.23 mm, are twisted together. This reinforcement is referred to as "b"; and a zinc-plated steel wire, the diameter of which is 1.3 mm. This reinforcement is designated "c". In the cobalt naphthenate and in all the compounds of cobalt and nickel described in the following examples, cobalt and nickel have valence 2 ($Co^{2+}$, $Ni^{2+}$).

EXAMPLE 1

Reinforcements a, b, c, previously defined, are treated in accordance with the invention with sulfur-containing cobalt compounds. These treatments are indicated in the following Table 1.

TABLE 1

| | Treated Reinforcement | | | | |
|---|---|---|---|---|---|
| | | Treatment Conditions | | | |
| Initial Reinforcement | Ref. Of Treated Reinforc. | Duration | Temp. | Cobalt Compound | Hydroxylated Compound |
| a | | | | | |
| (brass-plated cable) | a1 | 10 sec | 160° C. | TDP | EG |
| | a2 | 30 sec | 200° C. | TDP | DEG |
| | a3 | 10 sec | 160° C. | TDA | EG |
| | a4 | 10 sec | 160° C. | HDT | EG |
| b | | | | | |
| (steel-cable) | b1 | 30 sec | 130° C. | TDP | EG |
| | b2 | 30 sec | 130° C. | DTDP | EG |
| c | | | | | |
| (zinc-plated steel wire) | c1 | 1 sec | 130° C. | TDP | EG |
| | c2 | 5 sec | 130° C. | TDP | PEG |
| | c3 | 5 sec | 130° C. | TDP | BDI |
| | c4 | 1 min | 130° C. | TDA | EG |
| | c5 | 5 sec | 130° C. | DTDP | EG |
| | c6 | 30 sec | 130° C. | HDT | EG |

Abbreviations used:
TDP: thiodipropionate
HDT: hexanedithiolate
EG: ethylene glycol
PEG: polyethylene glycol
TDA: thiodiacetate
DTDP: dithiodipropionate
DEG: diethylene glycol
BDI: 1,3-butanediol The treatment is effected by immersing the reinforcement a, b or c in the treatment solution consisting of the liquid hydroxylated organic compound containing, in solution, 1% by weight of the corresponding cobalt compound.

The solution containing the reinforcement is brought to a temperature of more than 100° C. for a given period of time, these temperatures and contact times being indicated in Table 1.

The treated reinforcements are then removed from the treatment solution and rinsed, for instance by immersion, with an alcohol of low boiling point, in particular ethanol.

Measurement specimens are then produced by incorporating the untreated or treated reinforcements in composition A or B. Each specimen comprises a rectilinearly arranged reinforcement coated with composition A or B over a length of 1 cm, and this specimen is then vulcanized.

The specimens obtained are indicated by the reference letter corresponding to the composition followed by the reference corresponding to the reinforcement, whether or not treated, incorporated in this composition. For example, specimen Aa corresponds to an untreated brass-coated steel cable "a" incorporated in composition A, said composition A being without a cobalt compound; specimen Aa1 corresponds to a treated brass-plated steel cable a1 incorporated in composition A; and specimen Ba corresponds to an untreated brass-plated steel cable "a" incorporated in composition B, the composition containing cobalt naphthenate.

All the reinforcements, whether treated or not, are associated with composition A; on the other hand, composition B is associated only with untreated reinforcements a, b, and c.

Static traction tests for tearing off the reinforcements from the vulcanized compositions are carried out on all of the specimens obtained, the speed of traction being 104 mm per minute. The results of these tests are given in Table 2 below. In this table, the results of the traction tests are given for each specimen in the form of two figures which follow each other: The first of these figures indicates the force in kilograms necessary in order to tear the reinforcement out of the composition in which it is incorporated, and the second figure, expressed in percent, indicates the percentage of the surface of the reinforcement bared upon the test, that is to say the percentage of the surface which is no longer covered by the composition. These two figures are separated by a slash when reporting the results. Each specimen is made in three series, each series corresponding to a plate containing composition A or B and ten identical reinforcements surrounded by this composition and arranged parallel to each other on a plane. Each plate is vulcanized in known manner by curing at 150° C. for 50 minutes in the case of composition A and 35 minutes in the case of composition B.

One of these three plates, after vulcanization, is cut between the reinforcements and parallel to them, giving a series of ten identical specimens which are subjected to the traction tests; an over-curing treatment at 140° C. is carried out for 12 hours on another one of these three vulcanized plates. The plate is then cut, as previously indicated, to obtain a series of ten identical specimens, which also are subjected to the traction tests.

A corrosion treatment is carried out on the last of the three vulcanized plates by soaking for seven days at 20° C. in an aqueous solution containing 1% by weight of sodium chloride. The plate is then cut as previously indicated to obtain a series of ten identical specimens which are subjected to the traction tests.

Each test result in Table 2 corresponds therefore to the arithmetic mean of 10 measurements, one for each of the ten identical specimens.

The traction tests thus give an estimate of the adherence of the specimens under the three conditions previously described (after curing, after over-curing, and after corrosion), the adhesion being better the higher the force (first figure) and the lower the percentage of baring. The percentage of baring, in particular, is of great importance since it depends essentially only on the strength of the bond between the reinforcement and the rubber-base composition, while the force depends both on the strength of the bond between the reinforcement and the composition, as well as on the strength of the composition itself.

TABLE 2

| Samples | Results of the Traction Tests | | |
|---|---|---|---|
| | After Curing | After Over-Curing | After Corrosion |
| With base of brass-coated cables | | | |
| Ba | 31/30% | 15/80% | 30/50% |
| Aa | 25/30% | 13/80% | 22/80% |
| Aa1 | 30/20% | 15/80% | 29/20% |
| Aa2 | 30/30% | 16/80% | 29/40% |
| Aa3 | 28/30% | 14/80% | 29/30% |
| Aa4 | 30/30% | 16/80% | 27/50% |
| With base of steel cables | | | |
| Bb | 8/98% | 9/100% | 9/100% |
| Ab | 5/100% | 3/100% | 3/100% |
| Ab1 | 9/98% | 16/95% | 4/100% |
| Ab2 | 26/60% | 25/60% | 5/100% |
| With base of zinc-plated steel wires | | | |
| Bc | 107/0% | 10/100% | 5/100% |
| Ac | 8/100% | 5/100% | 5/100% |
| Ac1 | 101/0% | 92/0% | 96/5% |
| Ac2 | 105/0% | 93/0% | 80/5% |
| Ac3 | 100/0% | 90/0% | 80/5% |
| Ac4 | 103/0% | 108/0% | |
| Ac5 | 112/0% | 97/0% | |
| Ac6 | 86/15% | 73/20% | |

The state of the art is represented by specimens Ba, Bb, Bc (untreated reinforcements associated with a cobalt-containing composition). A study of Table 2 permits the following remarks:

(a) Brass-coated cables

The cables treated in accordance with the invention and used with composition A without cobalt compound, give an adhesion greater than or comparable to that which is obtained in conventional manner with untreated cables used with composition B having a cobalt compound. This adhesion is in any event greater than that which is obtained with the untreated cable used with composition A without cobalt compound.

The cable treated with the solution of cobalt TDP in EG (specimen Aa1) gives a far better adhesion after corrosion than the prior art (specimen Ba) since the percentage of bared metal is much less.

(b) Steel cables

The cables treated in accordance with the invention and used with composition A give results superior to the prior art, after curing and after over-curing, the adherence after corrosion being of the same order as in the prior art.

(c) Zinc-plated wires

The wires treated in accordance with the invention and used with composition A give results comparable to the prior art after curing and definitely better results after over-curing and after corrosion.

This adherence is, in any event, far superior to that which is obtained with the untreated wire used with composition A, which does not incorporate a cobalt compound.

The adhesion tests after over-curing and after corrosion are particularly important in the case of automobile tires since the latter have a tendency to heat up upon travel, particularly in the case of tires for heavy vehicles and these tires are subjected to extensive corrosive action upon travel on roads on which salt is placed in order to remove snow.

The results obtained by the invention make it possible to use rubber-base compositions that do not incorporate cobalt compounds, which permits a substantial saving. In fact, the treatment of the metal reinforcements themselves with a cobalt compound before incorporation in a rubber-base composition is more economical since it uses extremely small quantities of these compounds.

EXAMPLE 2

This example describes the treatment of metal reinforcements with nonsulfur-containing cobalt compounds and the bonding results obtained.

The base reinforcements, which are the reinforcements a and c previously described, are treated in accordance with the following Table 3. The hydroxylated organic compounds and the cobalt compounds form solutions containing 1% by weight of the cobalt compounds.

TABLE 3

| Initial Reinforcement | Treated Reinforcement | | | | |
|---|---|---|---|---|---|
| | | Treatment Conditions | | | |
| | Ref. Of Treated Reinforc. | Duration | Temp. | Cobalt Compound | Hydroxylated Compound |
| a | a5 | 30 sec | 160° C. | ACAC | EG |
| | a6 | 30 sec | 200° C. | ACAC | DEG |
| | a7 | 30 sec | 160° C. | AC | EG |
| | a8 | 30 sec | 200° C. | AC | DEG |
| | a9 | 30 sec | 160° C. | HYD | EG |
| | a10 | 30 sec | 200° C. | HYD | DEG |
| c | c7 | 1 min | 130° C. | ACAC | EG |
| | c8 | 1 min | 130° C. | AC | EG |
| | c9 | 1 min | 130° C. | HYD | EG |

The new abbreviations have the following meaning:
ACAC = acetyl acetonate,
AC = acetate,
HYD = hydroxide.

The specimens are prepared and tested as in Example 1. The results of the tests are given in the following Table 4.

TABLE 4

| | Results of the Traction Tests | | |
|---|---|---|---|
| Samples | After Curing | After Over-Curing | After Corrosion |
| With base of Brass-treated cables | | | |
| Ba | 31/30% | 15/80% | 30/50% |
| Aa | 25/30% | 13/80% | 22/80% |
| Aa5 | 29/30% | 15/90% | 33/30% |
| Aa6 | 34/10% | 20/90% | 36/15% |
| Aa7 | 27/30% | 20/90% | 31/40% |
| Aa8 | 33/10% | 18/90% | 34/10% |
| Aa9 | 28/30% | 19/90% | 29/20% |
| Aa10 | 33/10% | 19/90% | 39/5% |
| With base of Zinc-plated wires | | | |
| Bc | 107/0% | 10/100% | 5/100% |
| Ac | 8/100% | 5/100% | 5/100% |
| Ac7 | 77/10% | 46/80% | 74/40% |
| Ac8 | 100/5% | 46/80% | 78/20% |
| Ac9 | 95/20% | 18/100% | 64/40% |

Table 4 leads to the following conclusions:
(a) Brass-plated cables

The cables treated in accordance with the invention and used with composition A which is without cobalt compound, give an adherence comparable to that of the prior art after curing or after over-curing and they give results definitely better than those of the prior art after corrosion (much smaller percentage of metal bared).

(b) Zinc-plated wires

The wires treated in accordance with the invention and used with composition A without cobalt compound, give a bonding inferior to that of the prior art after curing but they give an adherence which is definitely better after over-curing and after corrosion.

EXAMPLE 3

This example describes the treatment of metal reinforcements with nickel compounds and the adherence results obtained. These reinforcements are the brass-coated cables "a" previously described, which are treated in accordance with the following Table 5. The hydroxyl compounds and the metal compounds form solutions containing 1% by weight of the nickel compounds.

TABLE 5

| Initial Reinforcement | Treated Reinforcement | | | | |
|---|---|---|---|---|---|
| | | Treatment Conditions | | | |
| | Ref. Of Treated Reinforc. | Duration | Temp. | Nickel Compound | Hydroxl Compound |
| a | a11 | 10 sec | 160° C. | TDP | EG |
| | a12 | 10 sec | 160° C. | ACAC | EG |
| | a13 | 10 sec | 160° C. | AC | EG |

The specimens are prepared and tested as in Example 1 after curing and after over-curing. The results of the tests are given in the following Table 6.

TABLE 6

| | Results of the Traction Tests | |
|---|---|---|
| Samples | After Curing | After Over-Curing |
| Ba | 31/30% | 15/80% |
| Aa | 25/30% | 13/80% |
| Aa11 | 33/20% | 18/70% |
| Aa12 | 34/10% | 16/80% |
| Aa13 | 32/20% | 17/90% |

A study of Table 6 leads to the following conclusions:

The cables treated in accordance with the invention and used with composition A without cobalt compound, give better adherence results after curing than the prior art, and comparable results after over-curing.

EXAMPLE 4

The purpose of this example is to show that the reinforcements treated in accordance with the invention can be used, if desired, with compositions having metal compounds which favor adherence. For this purpose one produces, in accordance with Example 1, specimens having a base of composition B and reinforcements a1, b1, c1 the treatment of which is described in Table 1. The tests described in Example 1 are carried out on these specimens. The adherence results are given in the following Table 7:

TABLE 7

| | Results of the Traction Tests | | |
|---|---|---|---|
| Samples | After Curing | After Over-Curing | After Corrosion |
| Ba | 31/30% | 15/80% | 30/50% |
| Bb | 8/98% | 9/100% | 9/100% |
| Bc | 107/0% | 10/100% | 5/100% |
| Ba1 | 30/20% | 22/30% | 29/30% |
| Bb1 | 29/50% | 27/70% | 30/50% |

TABLE 7-continued

| | Results of the Traction Tests | | |
|---|---|---|---|
| Samples | After Curing | After Over-Curing | After Corrosion |
| Bc1 | 114/0% | 77/5% | 112/0% |

A study of Table 7 shows that better adherence results are obtained with the treated reinforcements than with the untreated reinforcements.

EXAMPLE 5

The purpose of this example is to show that the treatment of metal reinforcements with metal compounds is not effective if the hydroxylated organic compounds are replaced by nonhydroxylated compounds.

In this example reinforcements "a" and "c" are used, treated in accordance with Table 8 below, the content of cobalt compound in the nonhydroxylated organic compound being 1% by weight.

TABLE 8

| | Treated Reinforcement | | | | |
|---|---|---|---|---|---|
| | | Treatment Conditions | | | |
| Initial Reinforcement | Ref. Of Treated Reinforc. | Duration | Temp. | Cobalt Compound | Non-Hydroxl Compound |
| a | | | | | |
| | a14 | 10 min | 110° C. | TDP | TOL |
| | a15 | 30 sec | 160° C. | TDP | HP |
| | a16 | 30 sec | 160° C. | TDP | GV |
| c | | | | | |
| | c10 | 10 min | 110° C. | TDP | TOL |
| | c11 | 1 min | 130° C. | TDP | HP |
| | c12 | 1 min | 130° C. | TDP | GV |

The new abbreviations are as follows:
TOL = toluene;
HP = paraffin oils;
GV = vaseline grease.

The specimens are obtained in treated as in Example 1, the results of the traction tests being given in Table 9 below.

TABLE 9

| | Results of the Traction Tests | | |
|---|---|---|---|
| Samples | After Curing | After Over-Curing | After Corrosion |
| Ba | 31/30% | 15/80% | 30/50% |
| Aa | 25/30% | 13/80% | 22/80% |
| Aa14 | 30/30% | 15/80% | 20/50% |
| Aa15 | 24/30% | 13/90% | 20/60% |
| Aa16 | 28/30% | 13/80% | 19/60% |
| Bc | 107/0% | 10/100% | 5/100% |
| Ac | 8/100% | 5/100% | 5/100% |
| Ac10 | 25/80% | 5/100% | 6/100% |
| Ac11 | 18/90% | 5/100% | 5/100% |
| Ac12 | 18/100% | 5/100% | 5/100% |

A study of Table 9 shows that the reinforcements treated in a manner not in accord with the invention give, in general, adherence results inferior to the prior art when they are associated with composition A which is without cobalt compound.

The process in accordance with the invention has been described in the event that the reinforcement is immersed in the solution which is heated, but the invention covers other methods. Thus, for instance, the following methods can be contemplated: Heat the reinforcement so that its surface reaches the treatment temperature and then place this surface in contact with the unheated solution, or cover the surface of the reinforcement with a layer of solution, the surface and the solution being at room temperature, and then pass the support which has been coated in this manner into a treatment oven, the essential thing being that the assembly formed by the surface of the support and the solution in contact with it is brought to a temperature above 100° C. This temperature is preferably at most equal to 200° C. The coating of the surface of the support with the solution can be effected, for instance, by immersion in the solution or by spraying by means of a jet or an atomizer. The treatment in accordance with the invention can be carried out continuously. The time for which the surface of the support and the solution in contact with it are brought to the treatment temperature varies as a function of the solution, the surface and the temperature, this time varying preferably from 1 second to 30 minutes. The concentration in the solution of the cobalt and/or nickel compound or of these compounds together if there are several of them, is preferably at least equal to 0.1% by weight, this concentration being less than the limit of solubility of these compounds at the treatment temperature, this limit of solubility being for instance about 3% for the cobalt compounds.

The sole FIG. 1 of the drawing shows an Auger profile obtained on a reinforcement c1 (zinc-plated steel wire treated in accordance with Table 1).

This profile is obtained by Auger spectroscopy (AES: Auger Electron Spectroscopy) consisting, in known manner, in bombarding the surface of a specimen of this reinforcement with a beam of primary electrons in order to analyze the beam of Auger electrons emitted, which are characteristic of the elements present. One can then abrade the surface of the specimen, for instance with argon ions, in order to obtain a profile as a function of the depth.

For this measure, use is made of an apparatus of the RIBER Company of France, employing for the abrasion a beam of argon ions of 3 keV, the pressure in the enclosure being $4.10^{-5}$ mm Hg ($5.33.10^{-3}$ Pa), and using for the analysis a beam of electrons of an energy of 3 keV, the width of the beam being about 50 μm.

In this way there is obtained an elementary profile formed of three curves marked 1, 2 and 3 in the FIGURE. Curve 1 corresponds to cobalt, curve 2 corresponds to the zinc of the zinc-plated steel, and curve 3 corresponds to iron.

The abscissa axis corresponds to the abrasion time in seconds counted from the start of this abrasion, the ordinate axis representing the intensity of the radiation emitted, corresponding, for each curve, to the metal in question, the unit being arbitrary.

From the FIG. 1 it is noted that for short abrasion times, for instance less than 100 seconds, the cobalt and the zinc are both present, that is to say the surface of the reinforcement contains both the metal of the treatment compound (cobalt) and at least one metal present in the metal surface before the treatment (zinc). The metal of the treatment compound (cobalt) therefore does not form a true surface deposit.

By way of example, it can be noted from the FIG. 1 that the maximum $M_1$ of curve 1 (cobalt) corresponds to a very short abrasion time, this time being less than 1 minute. This maximum $M_1$ is located in front of the maximum $M_2$ for zinc (curve 2) and in front of any substantial detection of the iron.

The reinforcements treated in accordance with the invention can be used to reinforce articles, in particular belts, hoses and tires, for instance in the form of carcasses or crown plies in these tires, by incorporating these reinforcements in a rubber composition, this composition preferably containing sulfur, and vulcanizing the article thus obtained.

The invention is of course not limited to the embodiments described above.

We claim:

1. A method of treating a reinforcement at least the surface of which is metallic to improve its adherence to a vulcanized rubber-base composition comprising placing said metallic surface of the reinforcement into contact with an anhydrous solution of at least one member of the group consisting of cobalt compounds, nickel compounds and compounds of both cobalt and nickel in at least one organic compound containing one or more hydroxyl groups, the said contact with the anhydrous solution taking place at a temperature above 100° C., and removing the anhydrous solution from the reinforcement before placing the reinforcement into contact with the rubber-base composition, the surface of the reinforcement having present therein after the treatment and before placing the reinforcement into contact with the rubber-base composition to be vulcanized both a member of the group consisting of cobalt and/or nickel, incorporated in the surface from the cobalt and/or nickel compound present in the solution used in the treatment and at least one metal present in the metal surface before the treatment to increase the adherence of the reinforcement to the rubber-base composition upon vulcanization of the rubber-base composition.

2. A method according to claim 1, wherein the metal surface of the reinforcement is at least in part, a metal having an electronegativity potential which is less than that of cobalt and that of nickel.

3. A method according to claim 2, wherein the reinforcement is made of steel, of zinc-plated steel, or of brass-plated steel.

4. A method according to any of claim 1, wherein at least one member of the group consisting of cobalt compounds and nickel compounds is a sulfur-containing compound or a hydrate of a sulfur-containing compound.

5. A method according to claim 4, wherein the compound in solution is selected from the group consisting of (a) a thiophene carboxylate of Formula (1):

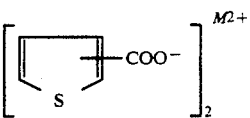

(b) a compound of Formula (2):

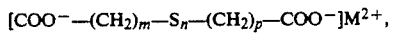

(c) a compound of Formula (3)

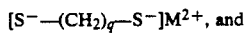

(d) hydrates of the compounds a, b and c, above,

M in the above formulas representing a metal selected from the group consisting of cobalt and nickel, m, n and p, which are identical or different, have values which may vary from 1 to 5, and q is equal to 6.

6. A method according to claim 5, wherein the compound in solution is selected from the group consisting of cobalt thiodipropionate and nickel thiodipropionate.

7. A method according to claim 1, wherein at least one member of the group consisting of cobalt compounds and nickel compounds is a nonsulfur-containing compound or a hydrate of a nonsulfur-containing compound.

8. A method according to claim 1, wherein at least one member of the group consisting of cobalt compounds, nickel compounds and compounds of both cobalt and nickel is an organic salt, a hydroxide, or an organic complex of cobalt and/or nickel or a hydrate thereof.

9. A method according to claim 8, wherein at least one member of the group consisting of cobalt compounds, nickel compounds and compounds of both cobalt and nickel is selected from the group consisting of acetates, propionates, benzoates, naphthenates, hydroxides, and acetylacetonates of cobalt and/or nickel or hydrates thereof.

10. A method according to claim 1, wherein the organic compound containing one or more hydroxyl groups is selected from the group consisting of ethylene glycol, diethylene glycol, polyethylene glycols and 1,3-butanediol.

11. A method according to claim 1, wherein the solution is brought to a temperature at most equal to 200° C.

* * * * *

UNITED STATES PATENT AND TRADEMARK OFFICE
CERTIFICATE OF CORRECTION

PATENT NO. : 5,221,559
DATED : June 22, 1993
INVENTOR(S) : Martigny et al.

It is certified that error appears in the above-identified patent and that said Letters Patent is hereby corrected as shown below:

Column 11, line 41, delete "any of";

Column 12, line 30, "claim 1" should read --claim 7--.

Signed and Sealed this

Third Day of May, 1994

Attest:

BRUCE LEHMAN

Attesting Officer

Commissioner of Patents and Trademarks